(12) United States Patent
Drescher

(10) Patent No.: US 7,003,538 B2
(45) Date of Patent: Feb. 21, 2006

(54) PROCESS AND APPARATUS FOR FINITE FIELD MULTIPLICATION (FFM)

(75) Inventor: Wolfram Drescher, Dresden (DE)

(73) Assignee: Systemonic AG, Dresden (DE)

( * ) Notice: Subject to any disclaimer, the term of this patent is extended or adjusted under 35 U.S.C. 154(b) by 581 days.

(21) Appl. No.: 10/071,708

(22) Filed: Feb. 8, 2002

(65) Prior Publication Data

US 2002/0138534 A1    Sep. 26, 2002

(30) Foreign Application Priority Data

Feb. 8, 2001  (DE) .................................. 101 06 085

(51) Int. Cl.
*G06F 15/00*    (2006.01)
(52) U.S. Cl. ...................................................... 708/492
(58) Field of Classification Search ............... 700/491, 700/492
See application file for complete search history.

(56) References Cited

U.S. PATENT DOCUMENTS

| | | | |
|---|---|---|---|
| 4,697,248 A * | 9/1987 | Shirota ...................... | 708/492 |
| 4,918,638 A * | 4/1990 | Matsumoto et al. ........ | 708/492 |
| 5,046,037 A * | 9/1991 | Cognault et al. ............ | 708/492 |
| 6,343,305 B1 * | 1/2002 | Ko.cedilla. et al. ......... | 708/492 |

* cited by examiner

*Primary Examiner*—Chuong D Ngo
(74) *Attorney, Agent, or Firm*—Baker Botts LLP

(57) ABSTRACT

Finite field multiplication of first and second Galois elements having n bit places and belonging to a Galois field GF $2^n$ described by an irreducible polynomial is performed by forming an intermediate result Z of intermediate sums of partial products of bit width $2n-2$ in an addition part of a Galois multiplier. The intermediate result Z is processed in a reduction part of a Galois multiplier by modulo dividing by the irreducible polynomial, whereby after all XOR's are traversed a result E with n bits is computed.

25 Claims, 8 Drawing Sheets

PROCESS AND APPARATUS FOR FINITE FIELD MULTIPLICATION (FFM)

BACKGROUND OF THE INVENTION

The invention relates to a process for performing a finite field multiplication of a first Galois element a represented by a bit vector $a_0 \ldots a_{n-1}$ in a first input register, to be multiplied by a second Galois element b represented by a bit vector $b_0 \ldots b_{n-1}$ in a second input register in a digital Galois multiplier (MUL), the Galois elements a and b being members of a Galois field GF $2^n$ described by an irreducible polynomial PR having a bit representation $PR_0 \ldots PR_n$.

In finite field multiplication of Galois elements, it is premised that the basic arithmetical operation in digital signal processing is specified in general by:

$$y = \sum_{i=0}^{n} x_i * a_i$$

Many algorithms can be reduced in essence to this folded sum, or arithmetically speaking, the summation across products. Usually in digital signal processing, these algorithms, e.g. in digital signal processors (DSP), are accelerated by the realization of a hard-wired hardware circuits implementing this summation of products. Such subassemblies are commonly referred to as multipliers (MUL).

If in this multiplier the arithmetic is applied in residue class fields with their modulo operation, use is made of a Galois MUL performing a finite field multiplication, in that in each line of the multiplier, first a partial product $a \times b_i$ (i=0 to n−1) is formed. Then the partial product is added to the sum of the preceding lines, before the modulo operation is performed. This is done by adding bit places $PR_0 \ldots PR_{n-1}$ to the sums previously computed, in accordance with an overflow occurring in the preceding line.

The invention relates further to one circuit apparatus each for carrying out the above-mentioned process according to claims 1 to 3, and to one circuit apparatus in which a Galois multiplier accumulator (MAC) is arranged, in which each of the said circuit apparatuses is contained.

A Galois MUL of cellular structure was described in "A Cellular Array Multiplier for GF($2^m$)," *IEEE Transactions on Computers*, Dec. 1971, 1573–1578, by B. A. Laws and C. K. Rushforth. In "Efficient Semisystolic Architectures for Finite Field Arithmetic," *IEEE Transactions on Very Large-Scale Integration (VLSI) Systems*, vol. 6 no. 1, Mar. 1988, pp. 101–113, Surendra K. Jain, Leilei Song and Keshab K. Parhi tabulate various algorithms for the realization of Galois multipliers and their representation in circuitry.

A disadvantage of the realizations previously specified is that they possess a high 'logical depth,' i.e. a multitude of gates to be traversed in succession, and therefore, long signal transit times occur upon their implementation in finite field multiplication.

The object of the invention is to accelerate finite field multiplication.

SUMMARY OF THE INVENTION

The process side solution to this problem provides that in a first part of the Galois MUL, an addition part, in one process step an intermediate result Z of intermediate sums of partial products of bit width 2n−2 is formed, which does not represent any element of the Galois field described by an irreducible polynomial PR, and that in a second part of the Galois MUL, a reduction part, the intermediate result Z having bit places $Z_{2n-2} \ldots Z_0$ is processed by means of a modulo division by the irreducible polynomial PR having bit places $PR_{n-1} \ldots PR_0$, and after traversing all XOR connections, the result E with bit places $E_{n-1} \ldots E_0$ is computed.

In this solution according to the invention, a tree structure is realized in the addition part, operating more rapidly than in the prior art by virtue of its parallel signal processing.

An advantageous modification of the process side solution provides that in a reduction part, the modulo division of the intermediate result Z by the irreducible polynomial PR is carried out in two steps, all bit places $Z_{2n-2} \ldots Z_n$ are respectively AND connected in a first process step with an expanded form PE of the irreducible polynomial PR, with bit places $PE_{n-1} \ldots PE_0$, and then, by means of a first parallel-operating adder tree structure effectively realizing the operation XOR, and then assembled.

These assembled partial results are subsequently AND connected in a second processing step with bit places $PR_{n-1} \ldots PR_0$ of the irreducible polynomial PR, and they are respectively connected by a second parallel-operating adder tree structure that also realizes the logical operation XOR effectively performed, in each instance to the bit places $Z_{n-1} \ldots Z_0$ of the intermediate result Z to yield the result E with bit places $E_{n-1} \ldots E_0$.

This solution according to the invention reflects the realization that in the reduction part also, by a two-stage paralleling of the signal paths, the signal transit times are additionally reduced.

A highly advantageous solution to the problem according to the invention provides that a matrix PEM of bit place arrangement $$PEM = : \begin{pmatrix} PE_{n-1,n-2} & \cdots & PE_{n-1,0} \\ & \cdots & \\ PE_{0,n-2} & \cdots & PE_{0,0} \end{pmatrix}$$

is precalculated with respect to the expanded form PE of the irreducible polynomial PR in the Galois field GF $2^n$, that in the reduction part the modulo division of the intermediate result Z by the irreducible polynomial PR is performed in that all bits $Z_{n-2} \ldots Z_n$ are each AND connected to the matrix PEM of the expanded form PE of the irreducible polynomial PR with bit places $PE_{n-1,n-2} \ldots PE_{n-1,0} \ldots PE_{0,n-2} \ldots PE_{0,0}$, and then, by means of a third parallel-operating adder tree structure realizing the logic operation XOR, assembled to form the result E.

In this solution according to the invention, an additional transit time curtailment is effected, in which all bit places $Z_{2n-2} \ldots Z_n$ of the intermediate result Z are AND connected by a precalculated data set of expanded form PEM of the irreducible polynomial, which are processed matrixwise in the reduction part of the Galois MUL, and then assembled in a single-step third parallel adder tree structure.

This application of the precalculated expanded irreducible polynomial in the modulo operation is effected by the single-step processing in the reduction part with special acceleration for the performance of the finite field multiplication.

An advantageous embodiment of the solution to the problem according to the invention provides that for variable Galois elements va<a and vb<b, with a resulting bit width 2m−2 of the intermediate result Z for adaptation to different Galois fields, all bit places of the intermediate result Z, before being connected to the expanded form PE of the irreducible polynomial PR, are shifted by $Z_{2mmax-2}$–$Z_m$ places by means of a decoder and field size adaptation logic, the bit width 2 mmax representing the maximum bit width of the intermediate result Z for maximal bit width n of each of the Galois elements a and b.

In this solution, account is taken of the fact that the Galois MUL is made programmable and hence adaptable to the size of its processing tasks. This is accomplished in that leading zeroes not taken into account in the processing operations, by left shift of the operands when put into the Galois MUL.

An apparatus-wise advantageous embodiment of the solution to the problem according to the invention provides that a Galois multiplier accumulator (MAC) be arranged, that contains the Galois MUL, the first and second input registers, the expanded form PE and/or the irreducible polynomial PR, or the "preset register bank" containing the matrix PEM, the result register, and an adder, the output of the Galois MUL being connected to an input of the adder. Its output in turn is connected to an input of the first input register and/or an input of the second input register.

In this apparatus-side solution, the advantageous application of the Galois MUL according to the invention within a Galois multiplier accumulator (MAC) is of complex conformation.

The invention will be illustrated below in more detail in terms of an embodiment by way of example.

DETAILED DESCRIPTION OF THE INVENTION

Figure 1:
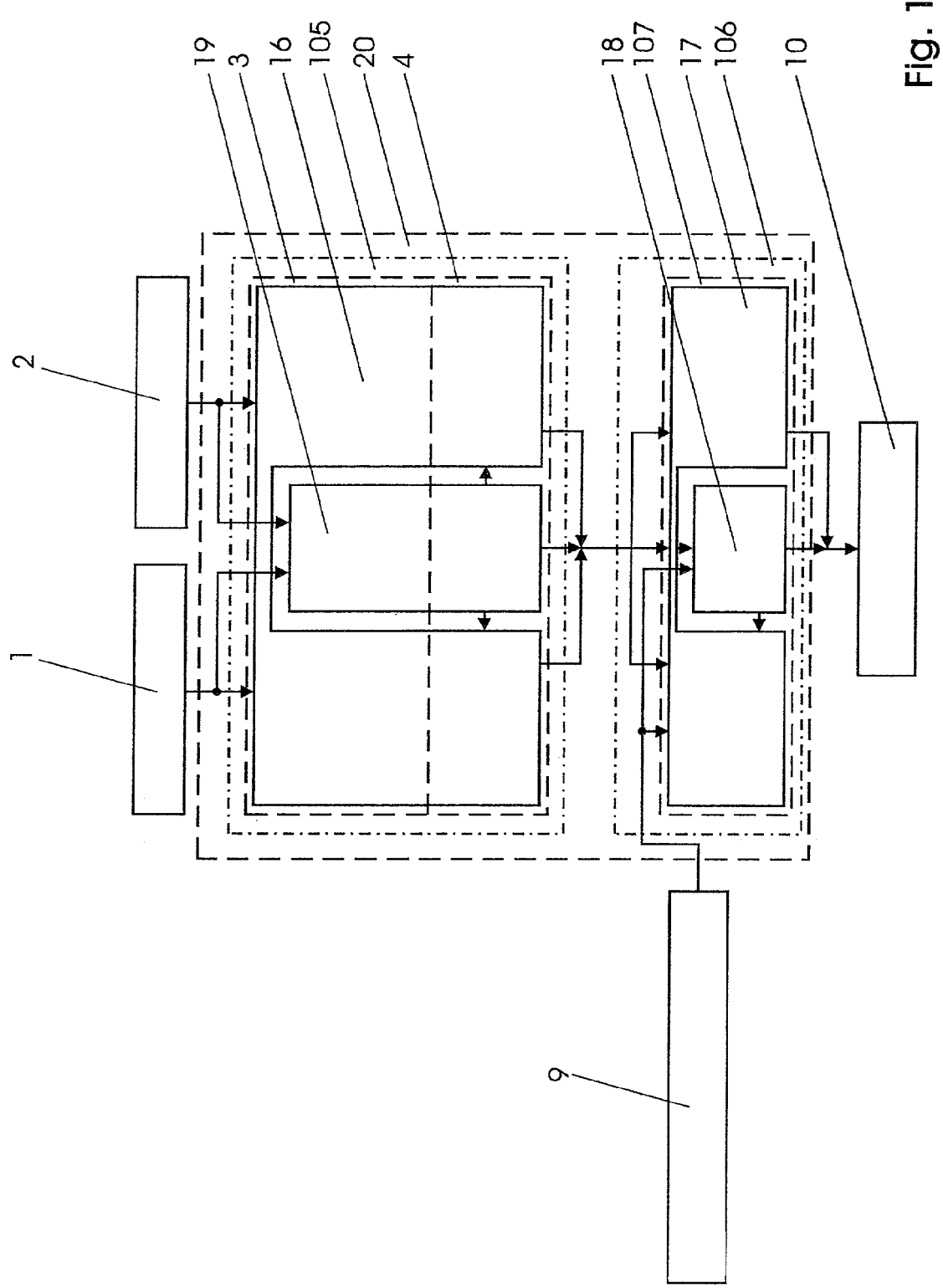
FIG. 1 shows a block diagram of a Galois MUL with bit multiplier and partial product adder in the addition part, and a reduction part with modulo reduction apparatus.

As may be seen in FIG. 1, in the first input register 1 a stored Galois element a and a Galois element b stored in the second input register 2 are furnished for the Galois MUL 20. The input goes into the addition part 105 of the Galois MUL 20, which also includes a reduction part 106. This reduction part 106 has the form of a modulo reduction apparatus 107. Within the Galois MUL 20, the addition part 105 generates an intermediate result for modulo processing in the modulo reduction apparatus 107. In addition, at the input of the modulo reduction apparatus 107, the stored irreducible polynomial PR 9 is made available.

The addition part 105 consists of a bit multiplier 3 and a partial product adder 4. The Galois elements a and b put into the Galois MUL 20 are individually multiplied out in the bit multiplier 3 with respect to their place values. They are made available as individual partial products to the partial product adder 4, in which they are additively assembled to yield the individual place values $Z_{2n-2} \ldots Z_0$. The addition part 105 consists in its apparatus of the partial product adder expansion structure 16 and the partial product adder key configuration 19.

The intermediate result Z is modulo combined with the value of the stored irreducible polynomial PR 9 in the modulo reduction apparatus 107, and can here be made available at the output with the value E for the adjoined result register 10.

The modulo reduction apparatus 107 consists in its apparatus of a modulo reduction expansion structure 17 and the modulo reducer key configuration 18.

Figure 2:
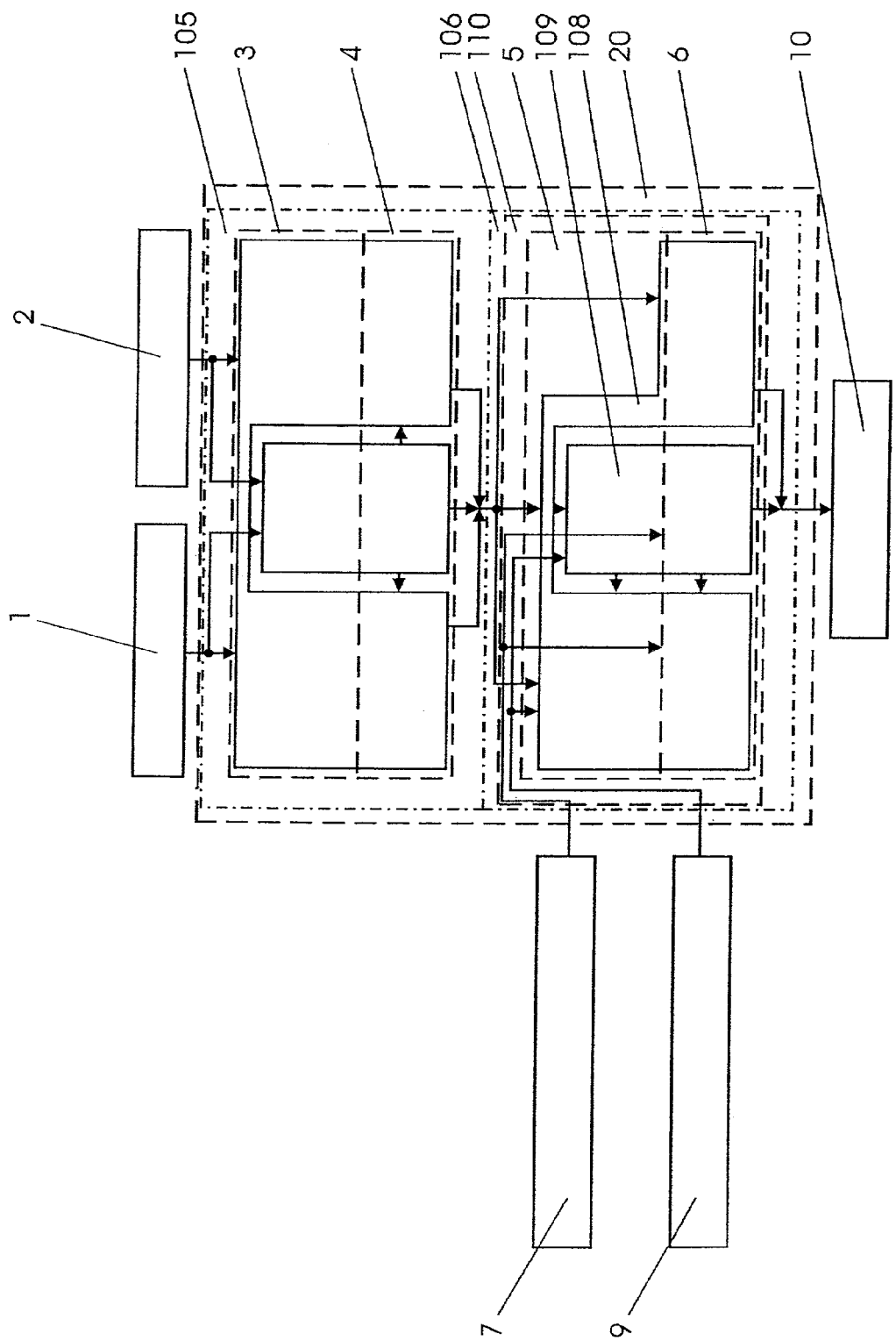
FIG. 2 shows a block diagram of a Galois MUL with bit multiplier and partial product adder in the addition part, and in the reduction part, a reduction two-step adder apparatus realizing the Q-reduction adder part and final adder part.

As may be seen in FIG. 2, the structure and mode of operation of the addition part 105 of the Galois MUL here described are coincident with that described in FIG. 1. In departure therefrom, to perform the modulo connection, here a precalculated expanded form PE 7 of the irreducible polynomial PR 9 is connected to carry out the modulo connection in the reduction part 106.

This expanded form PE 7 of the irreducible polynomial PR 9 is computed in three partial steps, subject to the convention:

p(0) designates the MSB and p(n) the LSB of the irreducible polynomial;

n is a field quantity.

The terms are computed with the matrix $$Z^{n \times n} = \begin{pmatrix} Z_{11} & \ldots & Z_{1n} \\ \vdots & & \vdots \\ Z_{n1} & \ldots & Z_{nn} \end{pmatrix}$$

and applied to the following routine:

1. Initializing the matrix $Z_{11}:=1$, setting all other elements of the 1st line to zero, $Z_{1j}:=0$, where $j=2 \ldots n$
2. Calculation of lines $i=2 \ldots n$ using the recursive formula $Z_{i,j}=Z_{(i-1),(j+1)}$ XOR (p(j) AND $Z_{(i-1),1}$) where $i=2 \ldots n$, $j=1 \ldots n-i+1$
3. Reading off the preset terms $r(i-1)=Z_{i,1}$, where $i=1 \ldots n$, and storing in the preset register 7

The reduction part 106 processing the intermediate result Z is here of two-step form, consisting of Q reduction adder part 5 and final adder part 6.

In the Q reduction adder part 5, all place values $Z_{2n-2} \ldots Z_n$ of the intermediate result Z present at its input are AND connected respectively to the bit places of the expanded polynomial, modulo added line by line in Q reduction adders, and these values made available for further processing in the subsequently adjoined final adder part 6. Here they are each AND connected to the bit places of the irreducible polynomial PR 9 adjoined at the input of the final adder part 6, and then these values are assembled columnwise together with the place values $Z_{n-1} \ldots Z_0$ of the intermediate result Z in the final adder part 6 by modulo addition, and given out at the output of the final adder part 6 to the result register 10.

The reduction two-step adder apparatus 110 consists, in its apparatus, of the two-step adder key configuration 109 and the two-step adder expansion structure 108.

Figure 3:
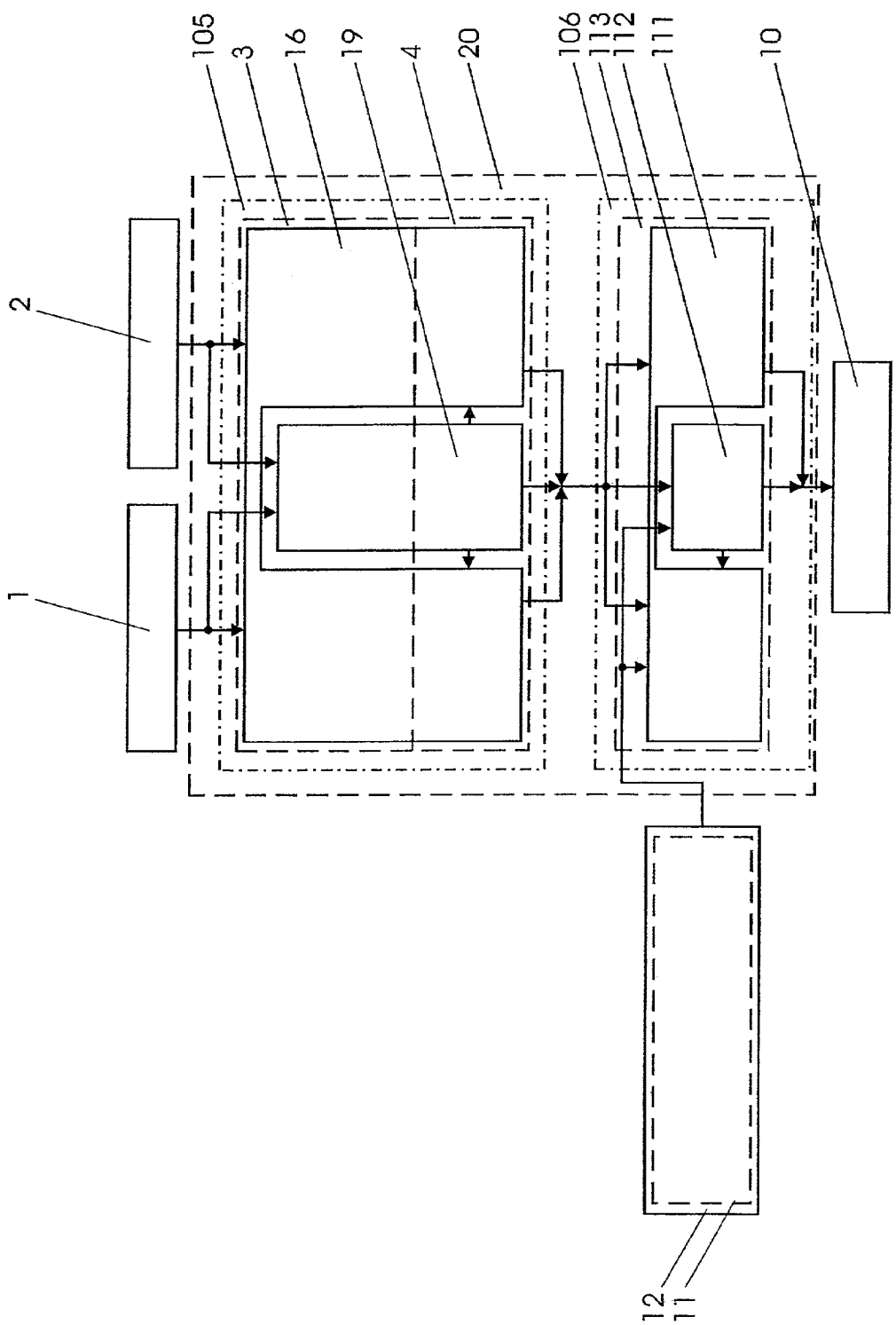
FIG. 3 shows a block diagram of a Galois MUL with bit multiplier and partial product adder in the addition part, and in the reduction part with reduction single-step adder apparatus.

As may be seen in FIG. 3, the structure and mode of operation of the addition part 105 of the Galois MUL 20 here described coincide with that described in FIGS. 1 and 2. In departure therefrom, to perform the modulo connection in the reduction part 106, instead of irreducible polynomial PR 9, or expanded form PE 7, a "preset register bank" 12 is here employed in place of irreducible polynomial PR 9 or expanded form PE 7, in which a matrix PEM 11 of precalculated terms of the irreducible polynomial is stored.

The calculation of the preset terms to be applied in this reduction single-step adder apparatus 113 is subject to the convention:

P0 designates the LSB of the irreducible polynomial PR 9

$PR_{ij}$ designates the j-th preset term for calculating the i-th result n designates field size The following routine is used:

$$PR_{ij} = (r_{j-1} \text{ AND } P_i \text{ XOR } r_{j-2} \text{ AND } P_{i-1} \text{ XOR} \ldots \text{XOR } r_{j-i-1} \text{ AND } P_0)$$

When a subscript of the r-terms or P-terms becomes <0, the calculation is broken off.

The reduction part 106 processing the immediate result Z is realized by the reduction one-step adder apparatus 113. In it, all place values $Z_{2n-2} \ldots Z_n$ of the intermediate result Z present at its input are each AND connected with the matrix of bit places of the adjoined preset register bank 12, and then these values are assembled line by line together with the respective place values $Z_{n-1} \ldots Z_0$ of the intermediate result Z modulo additively in adders, and at the outputs of the adders the result is made available to the result register 10.

The reduction one-step adder apparatus 113 consists in its arrangement of the one-step adder key configuration 112 and the one-step adder expansion structure 111.

Figure 4:
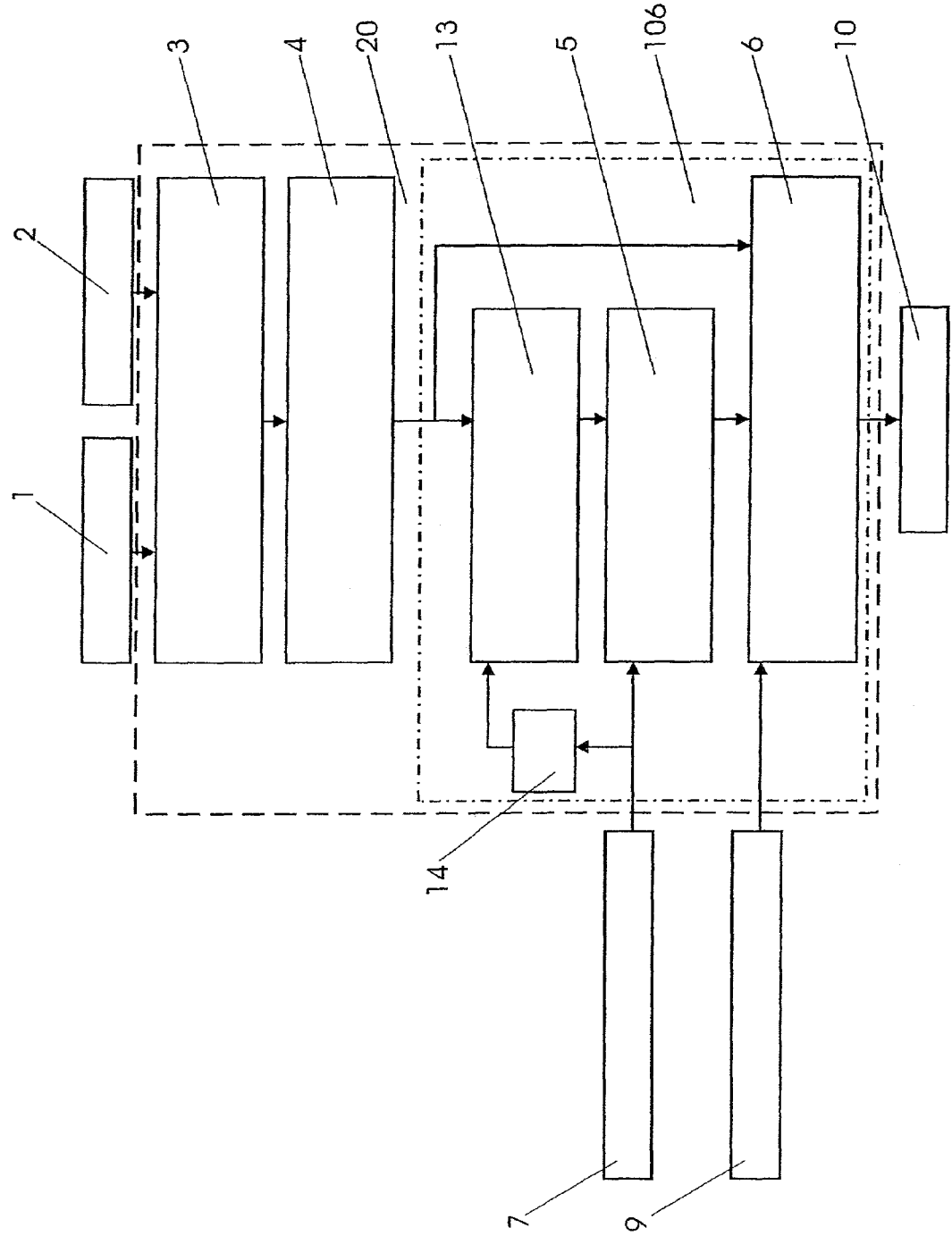
FIG. 4 shows a block diagram of a Galois MUL with bit multiplier and partial product adder in the addition part, and reduction part with decoder and field-size adaptation logic.

As may be seen in FIG. 4, the structure and the mode of operation of the Galois MUL 20 here described differ from the ones described in FIGS. 1 and 2 in that, in addition, a decoder 14 and a field-size adaptation logic 13 are employed in the processing of the intermediate result Z in the reduction part 106.

According to the bit width of the Galois elements stored in the first input register 1 and in the second input register 2, after processing in the addition part 105 upon occurrence of leading zeroes in the intermediate result Z, the bit place occupants of Z are left-shifted until no leading zeroes occur in the further processing of the intermediate result. In the field-size adaptation logic 13, this shift register function is realized.

Figure 5:
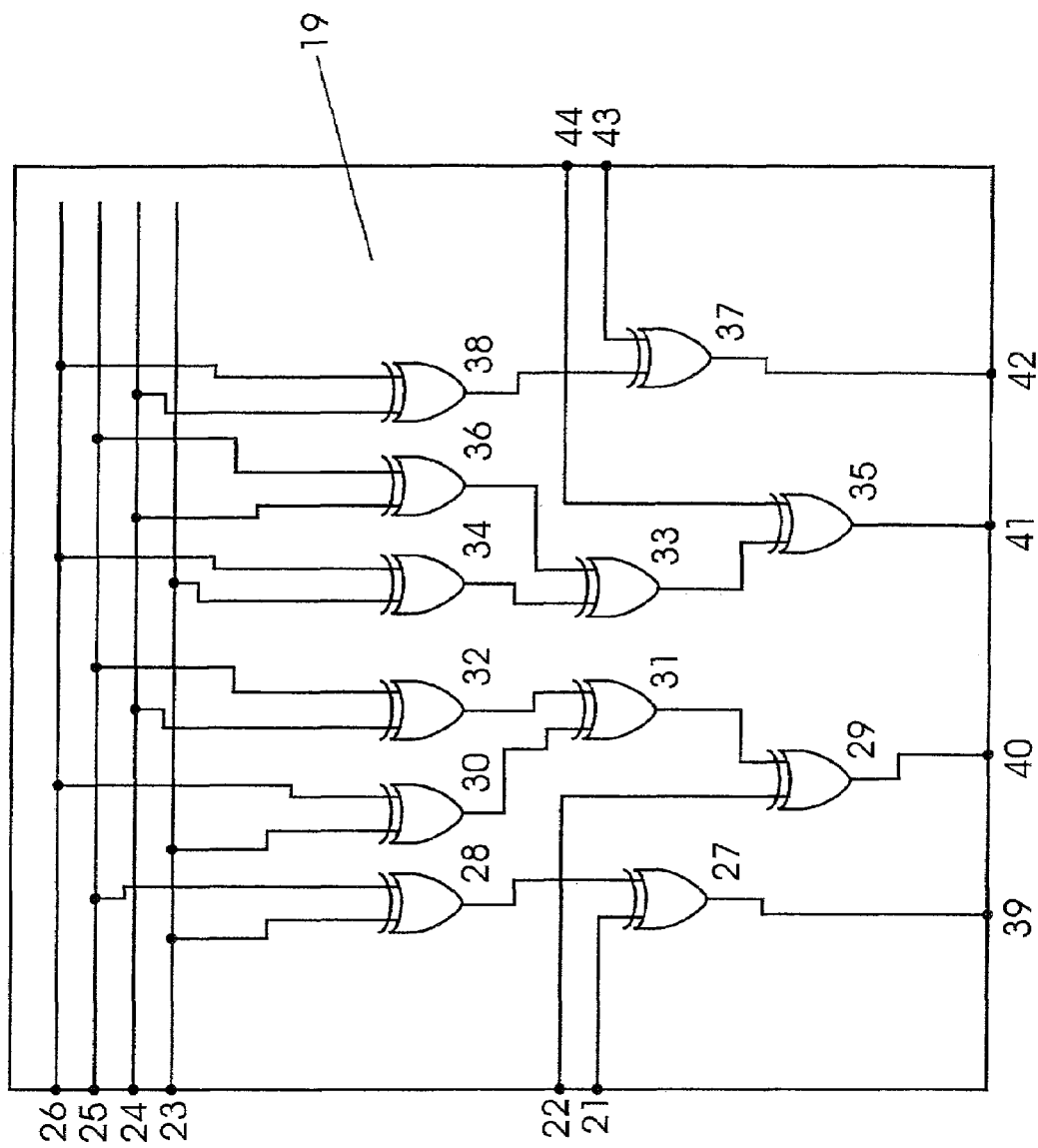
FIG. 5 shows a circuit diagram of a partial product adder key configuration.

As may be seen in FIG. 5, the place values of the Galois elements a and b present at the bit place terminal $a_{n-1}$ 23, bit place terminal $a_{n-2}$ 24, bit place terminal $b_{n-1}$ 25 and bit place terminal $b_{n-2}$ 26, are multiplied out in the first to sixth XOR bit place multiplier elements 28, 30, 32, 34, 36, 38, and then assembled modulo additively place to place by the first to sixth XOR addition elements 27, 29, 31, 33, 35, 37 and made available at the first to fourth intermediate result terminals 39, 40, 41 and 42 for further processing at the reduction part 106. The term terminal herein is used to refer to a position in the circuit, and does not imply a connector, terminal pad or other structure.

The first and second and the fifth and sixth XOR adder elements 27, 29 and 35, 37 are each connected to an input with the first to fourth partial product adder expansion terminals 21, 22 and 43, 44. By way of these expansion terminals, these assembling XOR adder elements are connected with additional XOR adder elements of the partial product adder expansion structure 16, in which additional partial products of additional bit place values of the stored Galois elements a and b are assembled, which together with their product components enter into the place values of the intermediate result present at the first to fourth intermediate result terminals 39, 40, 41 ands 42.

Figure 6:
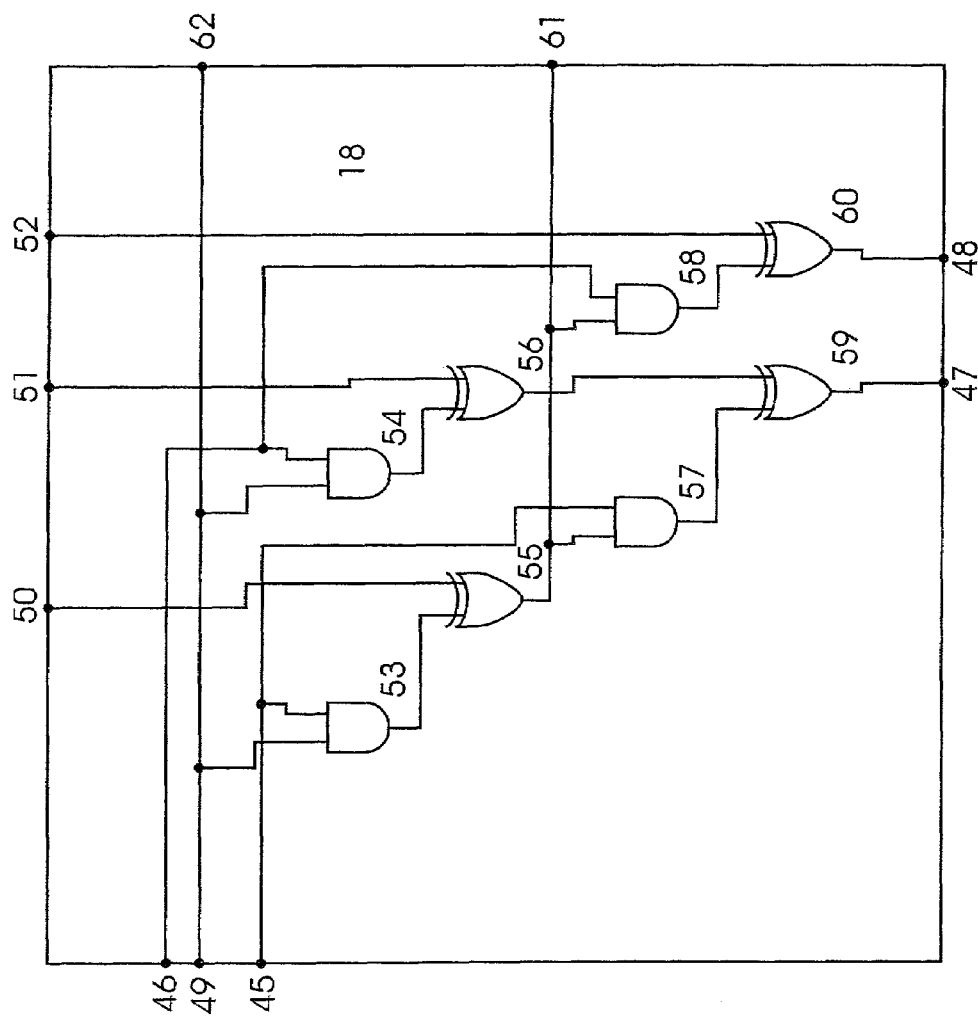
FIG. 6 shows a circuit diagram of a modulo reducer configuration.

As may be seen in FIG. 6, the apparatus realizes the algorithm of an MSB first Galois multiplier, and by way of the first to fourth reducer interim result terminals 49 to 52, the place values of a process intermediate result made available by the modulo reducer expansion structure 17 arrive in the modulo reducer key configuration 18, which performs the signal processing in two vertical processing planes.

In addition, by way of the connection of the first irreducible polynomial register terminal 45 and the second irreducible polynomial register terminal 46, the bit places $PR_{n-1}$ and $PR_{n-2}$ of the stored irreducible polynomial PR 9 are made available. These are therefore present at the first AND gate 53 and the third AND gate 57, and at the second AND gate 54 and fourth AND gate 58, and are gated with the respective processed MSB place values of the intermediate result Z.

These processed place values of the intermediate result Z at the same time form the MSB gate signals of the respective processing plane, and therefore the MSB gate signals for the AND connection of additional bit places of the irreducible polynomial PR 9. Hence the MSB gate signals firstly for the first processing plane are also present at an input of the second AND gate 54 and for further processing in the modulo reducer expansion structure 17 at the second reducer expansion terminal 62, and secondly for the second processing plane at an input of the fourth AND gate 58, and for further processing in the modulo reducer expansion structure 17 at the first reducer expansion terminal 61.

For the bit place $PR_{n-1}$ of the stored irreducible polynomial PR 9, the MSB gate signal in the first processing plane represents the signal occupancy of the first reducer intermediate result terminal 49, and in the second processing plane, the modulo connection of the signal occupancy of the second reducer intermediate result terminal 50 made available by the first XOR connector 55 with the output signal of the first AND gate 53.

Further, the signal occupancy of the processed place values of the intermediate result Z, present at the third reducer intermediate result terminal 51, is modulo multiplied in the second XOR connector 56 with the output signal of the second AND gate 54, which makes available the AND connection of the MSB gate signal of the first processing plane with the bit place $PR_{n-2}$ of the irreducible polynomial PR 9. Its output signal is applied to the inputs of the third XOR connector 59 for further modulo multiplication together with the output signal of the third AND gate 57, which performs the AND connection of the MSB gate signal of the second processing plane with the bit place $PR_{n-1}$ of the irreducible polynomial PR 9. Its output signal in turn makes available the signal occupancy for the result terminal $E_{n-1}$ 47.

Further, the signal occupancy of the processed place value of the intermediate result Z, present at the fourth reducer intermediate result terminal 52, is modulo multiplied in the fourth XOR connector 60 with the output signal of the fourth AND gate 58, which makes available the AND connection of the MSB gate signal of the second processing plane with the bit place $PR_{n-2}$ of the irreducible polynomial PR 9. Its output signal makes available the signal occupancy for the result terminal $E_{n-2}$ 48.

Figure 7:
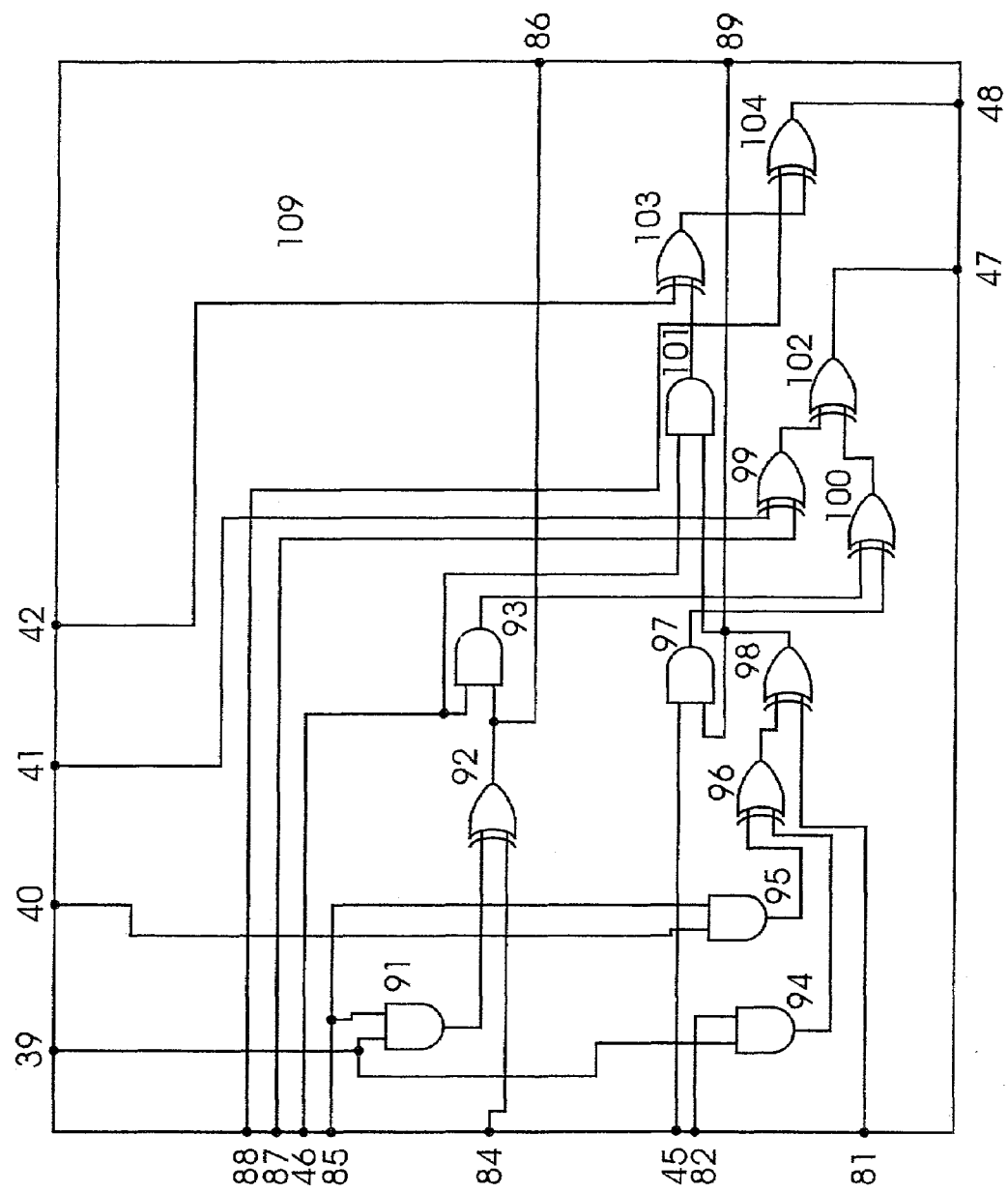
FIG. 7 shows a circuit diagram of a two-step adder key configuration.

As may be seen in FIG. 7, the two-step adder key configuration 109 realizes the signal processing in two vertical planes in two horizontally divided adder steps. By way of the first to fourth intermediate result terminals 39 to 42, the place values of the intermediate result Z as made available by the two-step adder expansion structure 108 arrive in the two-step adder key configuration 109.

Besides, by way of the connection of the first irreducible polynomial register terminal 45 and second irreducible polynomial register terminal 46, the bit places $PR_{n-1}$ and $PR_{n-2}$ of the stored irreducible polynomial PR 9 as well as by way of the first preset register terminal 82 and the second preset register terminal 85, the bit places $PE_{n-1}$ and $PE_{n-2}$ of the stored expanded form PE 7 of the irreducible polynomial PR 9 arrive in the two-step adder key configuration 109.

The bit place $Z_{n+1}$ of the intermediate result Z as made available by way of the first intermediate result terminal 39 is AND connected firstly at the input of the seventh cell gate 94 with the bit place $PE_{n-1}$ of the expanded form PE 7 of the irreducible polynomial PR 9, and secondly at the input of the fifth cell gate 91 with the bit place $PE_{n-2}$ of the expanded form PE 7 of the irreducible polynomial PR 9. The bit place $Z_n$ of the intermediate result Z as made available by way of the second intermediate result terminal 40 is AND connected at the input of the eighth cell gate 95 likewise with the bit place $PE_{n-2}$ of the expanded form PE 7 of the irreducible polynomial PR 9.

The outputs of the seventh and eighth cell gates 94, 95 are assembled in the first expansion gate 96, and then the sum signal present at its output is likewise modulo added in the second expansion adder 98 to an additional sum signal of the second processing plane of the two-step adder expansion structure 108, made available by way of the fifth reduction expansion terminal 81.

The output signal of the fifth cell gate 91 is modulo added to an additional sum signal of the first processing plane of the two-step adder expansion structure 108, made available by way of the sixth reduction expansion terminal 84, at the input of the third expansion adder 92. The output signal of the third expansion adder 92 forms the MSB gate signal of the first processing plane, and is then firstly connected to the sixth cell gate 93 and secondly applied to the ninth reduction expansion terminal 86, to afford an additional processing in the first processing plane of the two-step adder expansion structure 108.

The output of the second expansion adder 98 forms the MSB gate signal of the second processing plane, and for that purpose is connected firstly to the inputs of the ninth cell gate 97 and the tenth cell gate 101, and secondly to the tenth reduction expansion terminal 89, to afford further processing in the second processing plane of the two-step adder expansion structure 108.

The output signal of the third expansion adder 93 is AND connected in the sixth cell gate 93 with the bit place $PR_{n-2}$ of the stored irreducible polynomial PR 9, present by way of the second irreducible polynomial register terminal 46. The output signal of the second expansion adder 98 is AND connected in the ninth cell gate 97 to the bit place $PR_{n-1}$ of the stored irreducible polynomial PR 9, present by way of the first irreducible polynomial register terminal 45. With its output signal and the output signal of the sixth cell gate 93, a modulo addition takes place in the second output adder 100.

A modulo addition takes place likewise with the signal occupancy of the third intermediate result terminal 41 and the signal occupancy of the seventh reduction expansion terminal 87 in the first output adder 99. Its output signal is modulo added to the output signal of the second output adder 100 in the third output adder 102, and, with its output signal, forms the signal occupancy of the result register terminal $E_{n-1}$ 47.

The output signal of the second expansion adder 98 is AND connected in the tenth cell gate 101 to the bit place $PR_{n-2}$ of the stored irreducible polynomial PR 9, present by way of the second irreducible polynomial register terminal 46. Its output signal is modulo added to the signal occupancy of the fourth intermediate result terminal 42 in the fourth output adder 103. This output signal is modulo added to the signal occupancy of the eighth reduction expansion terminal 88 in the fifth output adder 104, and, with its output signal, forms the signal occupancy of the result register terminal $E_{n-2}$ 48.

Figure 8:
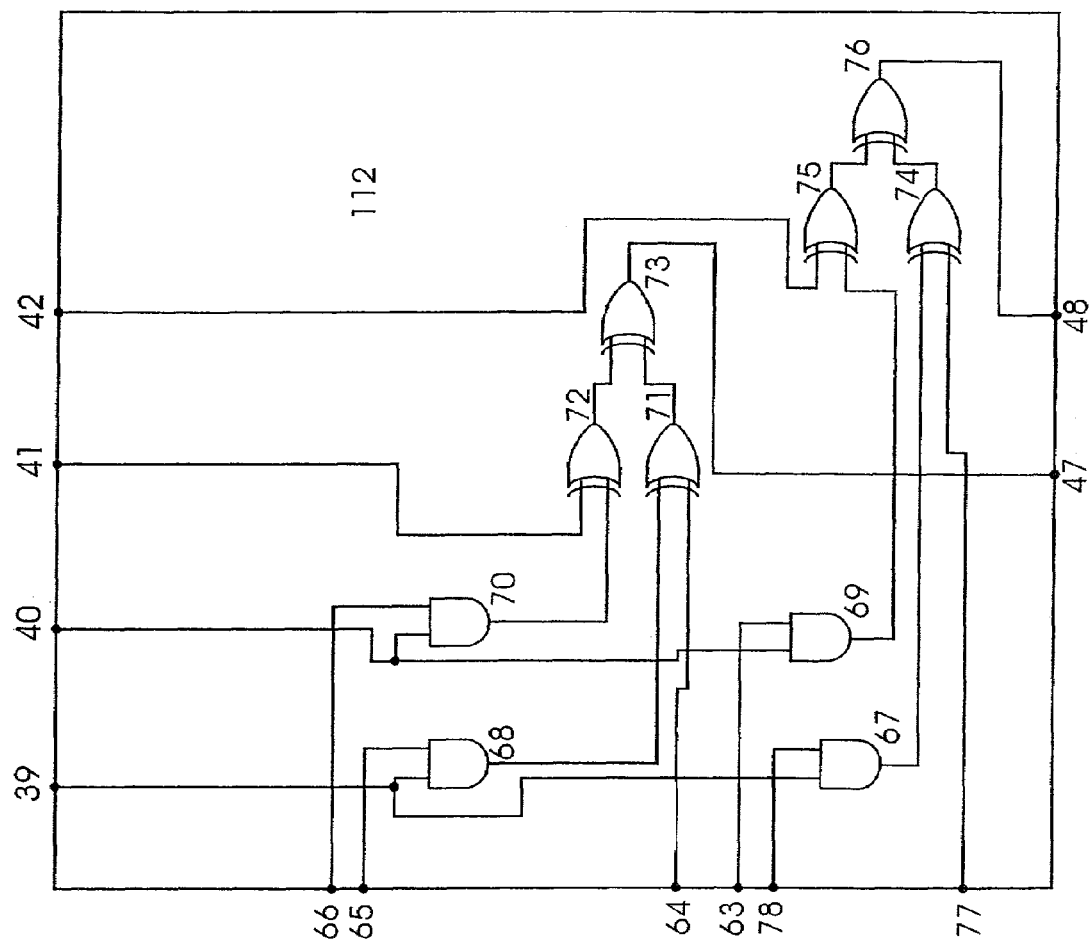
FIG. 8 shows a circuit diagram of a single-step adder key configuration.

As may be seen in FIG. 8, the one-step adder key configuration 112 realizes the signal processing in two vertical planes and in only one horizontally unfolded adder step. By way of the first to fourth intermediate result terminals 39 to 42, the place values of the intermediate result Z as made available by the one-step adder expansion structure 111 arrives in the one-step adder key configuration 112.

Besides, by way of the first PEM terminal 65, second PEM terminal 66, third PEM terminal 63 and fourth PEM terminal 78, the bit places $PE_{n-2,0}$ and $PE_{n-1,0}$ as well as $PE_{n-2,1}$ and $PE_{n-1,1}$ of the stored matrix PEM 11 of the expanded form PE 7 of the irreducible polynomial PR 9 arrive in the one-step adder key configuration 112.

The bit place $Z_{+1}$ of the intermediate result Z as made available by way of the first intermediate result terminal 39 is AND connected firstly at the input of the second cell gate 68 to the bit place $PE_{n-2,0}$ of the matrix PEM 11, and secondly at the input of the first cell gate 67 to the bit place $PE_{n-2,1}$ of the matrix PEM 11.

The bit place $Z_n$ of the intermediate result Z as made available by way of the second intermediate result terminal 40 is AND connected firstly at the input of the fourth cell gate 70 to the bit place $PE_{n-1,0}$ of the matrix PEM and secondly at the input of the third cell gate 69 to the bit place $PE_{n-1,1}$ of the matrix PEM 11.

A modulo addition takes place with the signal occupancy of the third intermediate result terminal 47 and the output signal of the fourth cell gate 70 in the second XOR partial adder 72.

With the signal occupancy of the third reduction expansion terminal 64 and the output signal of the second cell gate 68, a modulo addition takes place in the first XOR partial adder 71. Its output signal is likewise modulo added in the third XOR partial adder 73 to the output signal of the second XOR partial adder 72, and, with its output signal, forms the signal occupancy of the result register terminal $E_{n-1}$ 47. A further modulo addition takes place with the signal occupancy of the fourth intermediate result terminal 42 and the output signal of the third cell gate 69 in the fifth XOR partial adder 75. With the signal occupancy of the fourth reduction expansion terminal 77 and the output signal of the first cell gate 67, a modulo addition takes place in the fourth XOR partial adder 74. Its output signal is modulo added likewise to the output signal of the fifth XOR partial adder 75 in the sixth XOR partial adder 76, and, with its output signal, forms the signal occupancy of the result register terminal $E_{n-2}$ 48.

The invention claimed is:

1. A method for performing a finite field multiplication of a first Galois element a, having bit places $a_0$ to $a_{n-1}$, provided to a first input register and a second Galois element b, having bit places $b_0$ to $b_{n-1}$, provided to a second input register, the Galois elements a and b belonging to a Galois field GF $2^n$ described by an irreducible polynomial PR with bit places $PR_0$ to $PR_{n-1}$, comprising forming in an addition part of a Galois multiplier an intermediate result Z of intermediate sums of partial products of bit width 2n−1, said intermediate sums not representing any element of said Galois field, and processing said intermediate result Z in a reduction part of said Galois multiplier by modulo dividing by the irreducible polynomial PR, whereby the result E, with bit places $E_{n-1}$ to $E_0$ is computed from the bit places resulting from the modulo dividing by XOR connections and wherein said modulo dividing is carried out in two steps, in a first process stage all bit places $Z_{2n-2}$ to $Z_n$ are each AND connected with an expanded form PE of the irreducible polynomial PR having bit places $PE_{n-1}$ to $PE_0$ and then assembled by a first parallel operating adder tree structure effectively realizing the operation XOR, and these assembled partial results are subsequently each AND connected in a second process stage with the bit places $PR_{n-1}$ to $PR_0$ of the irreducible polynomial PR and using a second parallel-operating adder tree structure effecting the logic operation XOR, assembled with the bit places $Z_{n-1}$ to $Z_0$ of the intermediate result Z to form the result E with bit places $E_{n-1}$ to $E_0$.

2. A method according to claim 1, wherein a matrix PEM of bit place arrangement:

$$PEM = : \begin{matrix} (PE_{n-1,n-2} & \ldots & PE_{n-1,0}) \\ (PE_{0,n-2} & \ldots & PE_{0,0}) \end{matrix}$$

is precalculated with respect to an expanded form PE of said irreducible polynomial PR, and wherein said modulo dividing of said intermediate result Z is performed by AND connecting bits $Z_{2n-2}$ to $Z_n$ with the bit places of said matrix PEM and then, using a third parallel adder tree structure applying the multiple logic operation XOR, each assembled with the bit places $Z_{n-1}$ to $Z_0$ of the intermediate result Z to yield the result E.

3. A method according to claim 2, wherein said first and second elements have respective variable bit widths va<a and vb<b with a resulting intermediate result Z having a bit width 2m−2, wherein the bit places of the intermediate result Z are shifted $Z_{2mmax-2-Zm}$ places in a decoder and field size adaptation logic prior to being AND connected with said matrix PEM of the irreducible polynomial PR, where the bit width 2mmax represents the maximum bit width of the intermediate result Z corresponding to each maximum bit width of the Galois elements a and b.

4. A digital signal processor having a multiplier arranged to carry out the method of claim 3.

5. A digital signal processor having a multiplier arranged to carry out the method of claim 2.

6. A method according to claim 1, wherein said first and second elements have respective variable bit widths va<a and vb<b with a resulting intermediate result Z having a bit width 2m−2, wherein the bit places of the intermediate result Z are shifted $Z_{2mmax-2}-Z_m$ places in a decoder and field size adaptation logic prior to being connected with said expanded form PE of the irreducible polynomial PR, where the bit width 2mmax represents the maximum bit width of the intermediate result Z corresponding to each maximum bit width of the Galois elements a and b.

7. A digital signal processor having a multiplier arranged to carry out the method of claim 6.

8. A digital signal processor having a multiplier arranged to carry out the method of claim 1.

9. A finite field multiplier comprising a composite of individual cellular array multipliers assembled in a modulo reduction arrangement forming a most significant bit first matrix Galois multiplier, said Galois multipliers comprising an adder part, connected to first and second input registers, and including a partial product adder expansion structure and a partial product adder key structure connected together by first, second, third and fourth partial product expansion terminals; and a reducer part connected to receive an intermediate result output of said partial product adder and data derived from an irreducible polynomial PR, said reducer part arranged to combine said data and said intermediate result and provide a multiplication result to an output register.

10. A finite field multiplier as specified in claim 9, wherein the partial product adder key configuration comprises a first input of a first XOR adder element connected to a first partial product adder expansion terminal, wherein the first XOR adder element is connected with a second input to an output of a first XOR bit multiplier, wherein an output of the first XOR adder element is connected to a first intermediate result terminal, wherein said first XOR bit multiplier is connected with a first input to a bit place terminal $a_{n-1}$, wherein a second input of the first XOR bit place multiplier is connected to a bit place terminal $b_{n-1}$, wherein a first input of a second XOR adder element is connected to a second partial product expansion adder expansion terminal, wherein a second input of the second XOR adder element is connected to an output of a third XOR adder element, wherein an output of the second XOR adder element is connected to a second intermediate result terminal, wherein a first input of the third XOR adder element is connected to an output of a second XOR bit multiplier element, wherein a second input of the third XOR adder element is connected to an output of a third XOR bit multiplier element, wherein a first input of the second XOR bit multiplier element is adjoined to the bit place terminal $a_{n-1}$, wherein a second input of the second XOR bit multiplier element is connected to a bit place terminal $b_{n-2}$, wherein a first input of the third XOR bit multiplier element is connected to a bit place terminal $a_{n-2}$, wherein a second input of the third XOR bit multiplier element is connected to a bit place terminal $b_{n-1}$, wherein an output of a fourth XOR adder element is connected to a first input of a fifth XOR adder element, wherein an output of the fifth XOR adder element is connected to a third intermediate result terminal, wherein an input of the fourth XOR adder element is connected to an output of a fourth XOR bit multiplier element, wherein a first input of the fourth XOR bit multiplier element is connected to the bit place terminal $a_{n-1}$, wherein a second input of the fourth XOR bit multiplier element is connected to said bit place terminal $b_{n-2}$, wherein a second input of the fourth XOR adder element is connected to an output of a fifth XOR bit multiplier element, wherein a first input of a fifth XOR bit multiplier element is connected to a said bit place terminal $a_{n-2}$, wherein a first input of the fifth XOR bit multiplier element is connected to said bit place terminal $a_{n-2}$, wherein a second input of the fifth XOR bit place multiplier element is connected to said bit place terminal $b_{n-1}$, wherein a second input of the fifth XOR adder element is connected to a fourth partial product adder expansion terminal, wherein an output of a sixth XOR adder element is connected to a fourth intermediate result terminal, wherein a first input of the sixth XOR adder element is connected to an output of a sixth XOR bit multiplier element, the first input of which is connected in turn to said bit place terminal $a_{n-2}$, wherein a second input of the sixth XOR bit multiplier element is connected to said bit place terminal $b_{n-2}$, wherein a second input of the sixth XOR adder element is connected to a third partial product adder expansion terminal.

11. A digital signal processor having a finite field multiplier as specified in claim 10.

12. A finite field multiplier according to claim 9, wherein the reduction part consists of a modulo reduction apparatus containing a modulo reducer expansion structure and a modulo reducer key configuration.

13. A finite field multiplier according to claim 12, wherein said modulo reducer key configuration includes a first input of a first AND gate connected firstly to a first reducer intermediate result terminal and secondly to a second reducer expansion terminal, wherein a second input of said first AND gate is connected firstly to a first irreducible polynomial register terminal and secondly to a first input of a third AND gate, wherein an output of the first AND gate is connected to a first input of a first XOR connector, wherein a second input of the first XOR connector is connected to a second reducer intermediate result terminal, wherein an output of the first XOR connector is connected firstly to a first input of a third AND gate and further to a first reducer expansion terminal and moreover to a first input of a fourth AND gate, wherein an output of the third AND gate is connected to a first input of a third XOR connector, wherein an output of a third XOR connector is connected to a result register terminal $E_{n-1}$, wherein a second input of a second AND gate is connected firstly to a second irreducible polynomial register terminal and moreover to a second input of the fourth AND gate, wherein an output of the fourth AND gate is connected to a first input of a fourth XOR connector, wherein an output of the fourth XOR connector is connected to a result terminal $E_{n-2}$, wherein an output of the second AND gate is connected to a first input of a second XOR connector, wherein a second input of the second XOR connector is connected to a reducer intermediate result terminal, wherein an output of the second XOR connector is connected to a second input of the third XOR connector and wherein a second input of the fourth XOR connector is connected to a fourth reducer intermediate result terminal.

14. A digital signal processor having a finite field multiplier as specified in claim 13.

15. A finite field multiplier according to claim 9, wherein said reduction part consists of a reduction two-step adder apparatus containing a two-step adder expansion structure and a two-step adder key configuration.

16. A finite field multiplier according to claim 15, wherein said two-step adder key configuration comprises a fifth cell gate having a first impart connected firstly to a first input of a seventh cell gate and moreover to the first intermediate result terminal, wherein a second input of the fifth cell gate is connected firstly to a second preset register terminal and secondly to a first input of an eighth cell gate, wherein a second input of the eighth cell gate is connected to the second intermediate result terminal, wherein an output of the eighth cell gate is connected to a first input of a first expansion adder, wherein an output of the seventh cell gate is connected to a second input of the first expansion adder, wherein a second input of the seventh cell gate is connected to a first preset register terminal, wherein an input of the fifth cell gate is connected to a first input of a first expansion adder, wherein a second input of the first expansion adder is connected to a sixth reduction expansion terminal, wherein an output of the first expansion adder is connected firstly to a first input of a sixth cell gate and secondly to a ninth reduction expansion terminal, wherein a second input of the sixth cell gate is connected firstly to the second irreducible polynomial register terminal and secondly to a first input of a tenth cell gate, wherein an output of the first expansion adder is connected to a first input of a second expansion adder, wherein a second input of the second expansion adder is connected to a fifth reducer expansion terminal, wherein a first input of a ninth cell gate is connected to the first irreducible polynomial register terminal, wherein a second input of the ninth cell gate is connected firstly to an input of the second expansion adder and secondly to a second input of the tenth cell gate and moreover to a tenth reduction expansion terminal, wherein an output of the ninth cell gate is connected to a first input of a second output adder, wherein an output of the sixth cell gate is connected to a second input of the second output adder, wherein an output of the second output adder is connected to a first input of a third output adder, wherein a first input of a first output adder is connected to a seventh reduction expansion adder, wherein a second input of the first output adder is connected to the third intermediate result terminal, wherein an output of the first output adder is connected to a second input of the third output adder, wherein an output of the third output adder is connected to the result terminal $E_{n-1}$, wherein an output of the tenth cell gate is connected to a first input of a fourth output adder, wherein a second input of the fourth output adder is connected to the fourth intermediate result terminal, wherein an output of the fourth output adder is connected to a first input of a fifth output adder, wherein a second input of the fifth output adder is connected to an eighth reduction expansion terminal, wherein an output of the fifth output adder is connected to the result terminal $E_{n-2}$.

17. A digital signal processor having a finite field multiplier as specified in claim 16.

18. A finite field multiplier according to claim 9, wherein the reduction part consists of a reduction one-step adder apparatus containing a one-step adder expansion structure and a one-step key configuration.

19. A finite field multiplier according to claim 18, wherein said one-step adder key configuration includes a first input of a second cell gate is connected firstly to the first intermediate result terminal and secondly to a first input of a first cell gate, wherein a second input of the second cell gate is connected to a first PEM terminal, wherein an output of the second cell gate is connected to a first input of a first XOR partial adder, wherein a second input of the first XOR partial adder is connected to a third reducer expansion terminal, wherein a second input of the first cell gate is connected to a fourth PEM terminal, wherein a first input of a fourth cell gate is connected firstly to the second intermediate result terminal and secondly to a first input of a third cell gate, wherein a second input of the fourth cell gate is connected to a second PEM terminal, wherein an output of the fourth cell gate is connected to a first input of a second XOR partial adder, wherein a second input of the second XOR partial adder is connected to the third intermediate result terminal, wherein an output of the second XOR partial adder is connected to a first input of a third XOR partial adder, wherein an output of the first XOR partial adder is connected to a second input of the third XOR partial adder, wherein an output of the third XOR partial adder is connected to the result terminal $E_{n-1}$, wherein an output of the third cell gate is connected to an input of a fifth XOR partial adder, wherein a second input of the third cell gate is connected to a third PEM terminal, wherein an output of the first cell gate is connected to a first input of a fourth XOR partial adder, wherein a second input of the fourth XOR partial adder is connected to a fourth reducer expansion terminal, wherein a second input of the fifth XOR partial adder is connected to the fourth intermediate result terminal, wherein an output of the fifth XOR partial adder is connected to a first input of a sixth XOR partial adder, wherein an output of the fourth XOR partial adder is connected to a second input of the sixth XOR partial adder, and wherein its output is connected to the result terminal $E_{n-2}$.

20. A digital signal processor having a finite field multiplier as specified in claim 19.

21. A finite field multiplier according to claim 9, including a Galois multiplier accumulator, including said Galois multiplier, said first input register, said second input register, at least one of said expanded form and said irreducible polynomial PR, said result register and an adder, the output of the Galois multiplier being connected to the input of said adder and an output of said adder to the input of the result register, and the output of the result register being connected to one of the first input register and the second input register.

22. A digital signal processor having a finite field multiplier as specified in claim 21.

23. A finite field multiplier according to claim 9, including a Galois multiplier accumulator including said Galois multiplier, said first input register, said second input register, a preset register bank containing a matrix PEM, said result register and an adder, the output of the Galois multiplier being connected to the input of the adder, and an output of the adder being connected to an input of the result register and an output of the result register being connected to an input of one of the first input register and the second input register.

24. A digital signal processor having a finite field multiplier as specified in claim 23.

25. A digital signal processor having a finite field multiplier as specified in claim 9.

* * * * *